(12) United States Patent
Findlan et al.

(10) Patent No.: US 6,247,231 B1
(45) Date of Patent: Jun. 19, 2001

(54) METHOD FOR REPAIRING HEAT EXCHANGER TUBING THROUGH PARTIAL TUBE REPLACEMENT

(75) Inventors: Shane Joseph Findlan, Harrisburg; Jack C. Spanner, Charlotte, both of NC (US)

(73) Assignee: Electric Power Research Institute, Palo Alto, CA (US)

( * ) Notice: Subject to any disclaimer, the term of this patent is extended or adjusted under 35 U.S.C. 154(b) by 0 days.

(21) Appl. No.: 08/921,936

(22) Filed: Aug. 27, 1997

(51) Int. Cl.⁷ .................................................. B23P 6/00
(52) U.S. Cl. .................... 29/890.031; 165/76; 29/402.03
(58) Field of Search .......................... 165/76; 29/890.031, 29/447, 402.03

(56) References Cited

U.S. PATENT DOCUMENTS

| | | | |
|---|---|---|---|
| 3,579,805 | * 5/1971 | Kast | 29/447 |
| 3,806,693 | 4/1974 | Miller | 219/121 EB |
| 3,962,767 | * 6/1976 | Byerley et al. | 29/890.031 |
| 4,573,248 | 3/1986 | Hackett | 29/423 |
| 4,694,549 | * 9/1987 | Rabe | 29/890.031 |
| 4,723,578 | 2/1988 | Mordarski et al. | 138/97 |
| 5,066,846 | 11/1991 | Pirl | 219/121.63 |
| 5,479,699 | 1/1996 | Snyder | 29/727 |
| 5,514,849 | 5/1996 | Findlan et al. | 219/121.63 |

* cited by examiner

*Primary Examiner*—Allen Flanigan
(74) *Attorney, Agent, or Firm*—Pennie & Edmonds LLP

(57) ABSTRACT

A method of repairing a heat exchanger tube in a steam generator includes the step of removing a degraded tube segment from an operative heat exchanger tube in a steam generator. A weld metal ring is then positioned between the operative heat exchanger tube and a new tube segment. The weld metal ring is then welded to the operative heat exchanger tube and the new tube segment to form a linking tube section. The linking tube section is then heat treated. The new tube segment is then expanded toward a steam generator tubesheet. Finally, the new tube segment is welded to the tube sheet.

15 Claims, 8 Drawing Sheets

METHOD FOR REPAIRING HEAT EXCHANGER TUBING THROUGH PARTIAL TUBE REPLACEMENT

BRIEF DESCRIPTION OF THE INVENTION

This invention relates generally to the repair of heat exchanger tubing, such as in a steam generator. More particularly, this invention relates to a method of repairing such tubing in difficult to access geometries using laser welding techniques to achieve a partial replacement of the tubing.

BACKGROUND OF THE INVENTION

FIG. 1 illustrates a prior art steam generator 10. The steam generator 10 includes a shell 12, a tube bundle 14 positioned within the shell 12, a tube sheet 16 supporting the tube bundle 14, and a water box 18 positioned beneath the tube sheet 16. The tube bundle 14 includes a set of "U" shaped tubes 20. For clarity, only one "U" shaped tube 20 is shown in the figure, but it should be understood that the tube bundle 14 can be made up of thousands of individual tubes 20. A division plate 22 divides the water box 18 into an inlet section 24 and an outlet section 26.

The steam generator 10 receives hot reactor coolant in the water box 18 through nozzle 28. From the inlet section 24 of the water box 18, the coolant flows through tubes 20 to the outlet section 26 of the water box 18 and back to the reactor (not shown) through nozzle 30. Secondary water enters the shell 12 through nozzle 40 and is heated by contact with the tubes 20. As the secondary water is heated, it boils to generate steam, which exits the shell 12 at the top of the steam generator 10 through nozzles 42 and 44. The steam thus generated is routed to a steam turbine (not shown) where it is expanded to drive an electrical generator (not shown).

The tubes 20 are connected to a tube sheet 16 by seal welding or by expanding the tubes within the tube apertures in the tube sheet 16. Located at various heights in the shell 12 are tube support plates 50 containing apertures through which the tubes 20 pass. The apertures in the tube support plates 50 are slightly larger in diameter than the outside diameter of the tubes 20 so that the tubes can slide vertically within the support plates. This relative sliding capability is necessary to accommodate differential thermal expansion which occurs when the steam generator 10 is brought on-line and is slowly heated to operating temperature.

The steam generator tubes 20 are susceptible to several types of corrosion mechanisms that can ultimately lead to leakage or significant wall thinning. These corrosion mechanisms include primary water stress corrosion cracking, secondary side intergranular attack, secondary side intergranular stress corrosion cracking, and secondary side wastage. Primary side degradation typically occurs at locations of high tensile residual stress, such as expansion transition areas, inner row U-bends, and dented tube support locations. Secondary side degradation occurs at locations where impurities can concentrate, providing corrosion sites, such as tube-to-tubesheet crevices, tube support plate-to-tube interfaces, anti-vibration bars interfaces, and sludge pile regions (located at the tubesheet).

Current techniques to mitigate corrosion-induced problems include: plugging the degraded tubes, sleeving the degraded tubes, and replacing the steam generator. Plugging the degraded tubes takes the tube out of service, reducing the steam generator efficiency. The ability to plug tubes is based on the "plugging margin" that is calculated based on operating experience for each steam generator.

Sleeving is a more expensive mitigation technique; it involves welding a tube section or "sleeve" to the interior surface of a degraded region of the existing tube. Sleeving allows the tube to remain in service, with some reduction in flow rate. Sleeving is generally performed when the steam generator "plugging margin" is approached. The final option is to replace the steam generator. Replacement of the steam generator addresses the problem, but at a prohibitive cost.

The Electric Power Research Institute, the assignee of the present invention, has developed improved corrosion mitigation techniques that rely on cladding the inside surface of steam generator tubes with corrosion resistant weld metal using a nd:YAG laser to provide a permanent repair for steam generator tubing. This technology is described in U.S. Pat. Nos. 5,430,270 and 5,514,849, both of which are expressly incorporated by reference herein.

A majority of steam generator tube failures occur at the tubesheet region. During fabrication of the steam generator, tubes are mechanically or hydraulically expanded along the length of the tubesheet apertures to seal the area between the tube and the tubesheet. The intent is to prevent water and corrodants from creating corrosion products between the tube and the tubesheet. However, at the top surface of the tubesheet, a small change in tube diameter occurs (referred to as a "roll transition") where the rolling process is completed. This area is highly stressed and subjected to secondary water environment of the steam generator, which contains a variety of contaminants. Sludge from the accumulation of secondary water impurities further compounds the problem by providing additional concentration of corrosion products. As a result, this region is very susceptible to stress-corrosion cracking.

Currently, sleeving is the principal means of repair for tube-to-tubesheet location failures. However, recent plant experience has shown that the sleeves may fail due to improper installation, insufficient heat treatment, cold work stresses, and other factors. Consequently, techniques have been developed to cut and remove sleeves and to install new sleeves.

In view of the foregoing, it would be highly desirable to provide a method for repairing heat exchanger tubes. More particularly, it would be highly desirable to provide a method for repairing heat exchanger tubes at the tube-to-tubesheet region of a steam generator, which is the most common location for steam generator tube failures. Ideally, such a method would rely upon existing repair equipment.

SUMMARY OF THE INVENTION

A method of repairing a heat exchanger tube in a steam generator includes the step of removing a degraded tube segment from an operative heat exchanger tube in a steam generator. A weld metal ring is then positioned between the operative heat exchanger tube and a new tube segment. The weld metal ring is then welded to the operative heat exchanger tube and the new tube segment to form a linking tube section. The linking tube section is then heat treated. The new tube segment is then expanded toward a steam generator tubesheet. Finally, the new tube segment is welded to the tube sheet.

The invention provides a method for repairing heat exchanger tubes at the tube-to-tubesheet region of a steam generator, which is the most common location for steam generator tube failures. The method relies upon existing laser welding repair equipment and can therefore be readily implemented. The steps of the method are sequenced so that residual stresses along the operative tube and at the linking tube section are minimized.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
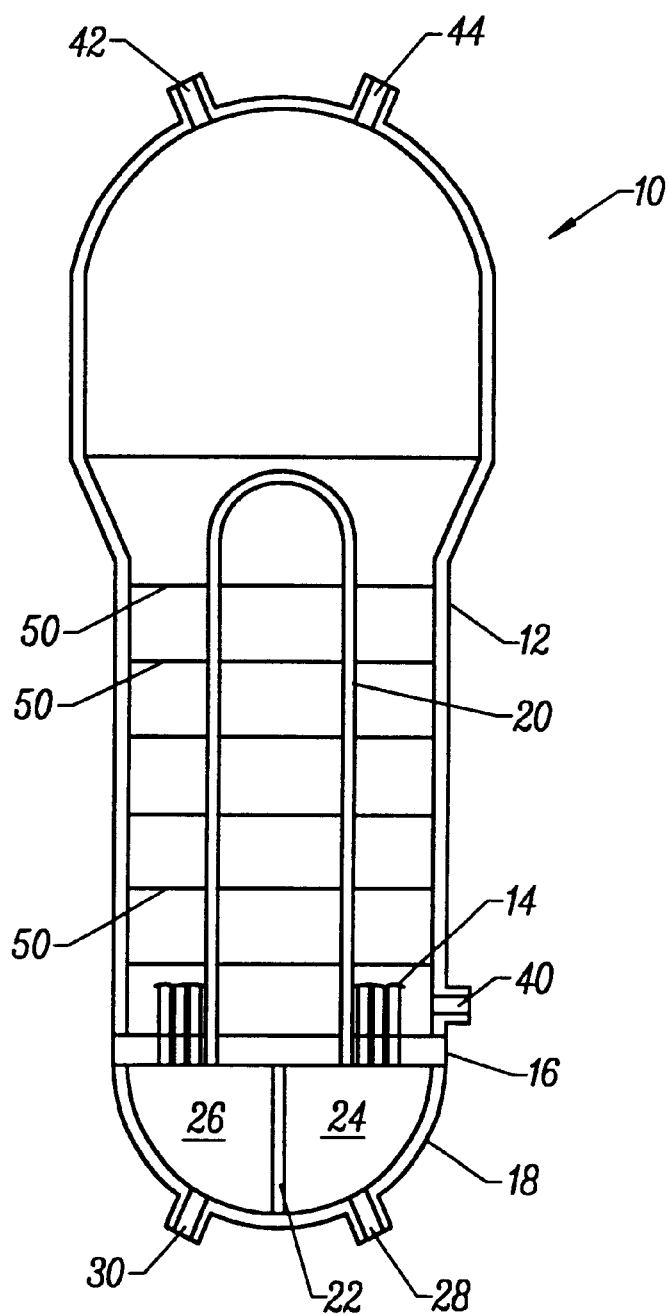
FIG. 1 illustrates a prior art steam generator that may be repaired in accordance with the method of the invention.
Figure 2:
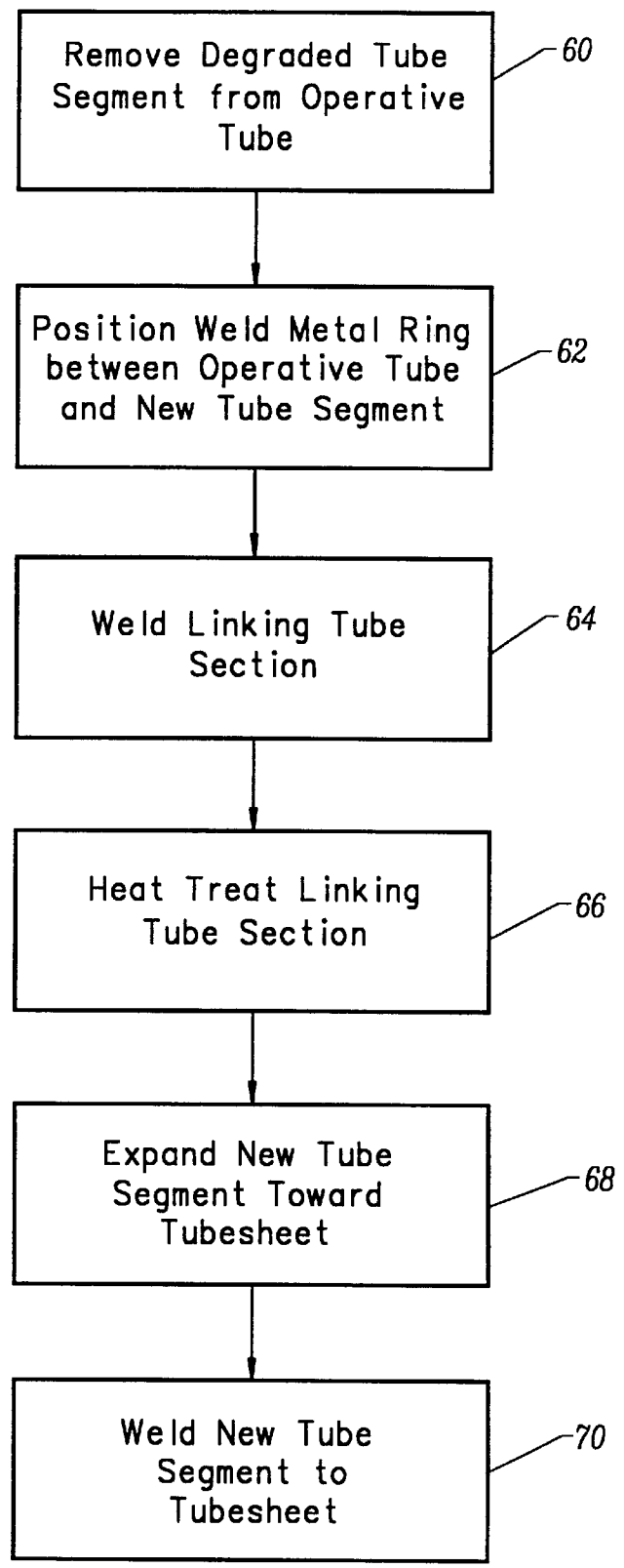
FIG. 2 illustrates processing steps associated with an embodiment of the invention.

FIG. 2 illustrates processing steps associated with an embodiment of the invention. The first processing step illustrated in FIG. 2 is to remove a degraded tube segment from an operative tube (step 60). As discussed below, this step may be performed with a cutting tool, such as a mechanical cutting device or a laser cutting device. The next processing step is to position a weld metal ring between the operative tube and a new tube segment (step 62). A preferable weld metal ring is disclosed below.

The next processing step shown in FIG. 2 is to weld the linking tube section (step 64). The linking tube section includes the operative tube, the weld metal ring, and the new tube segment. Preferably, heat treatment is then performed on the linking tube section (step 66).

The next processing step shown in FIG. 2 is to expand the new tube segment toward the tubesheet (step 68). At this point, the new tube segment is securely positioned within the steam generator. Preferably, the new tube segment is then welded to the tube sheet (step 70).

Figure 3:
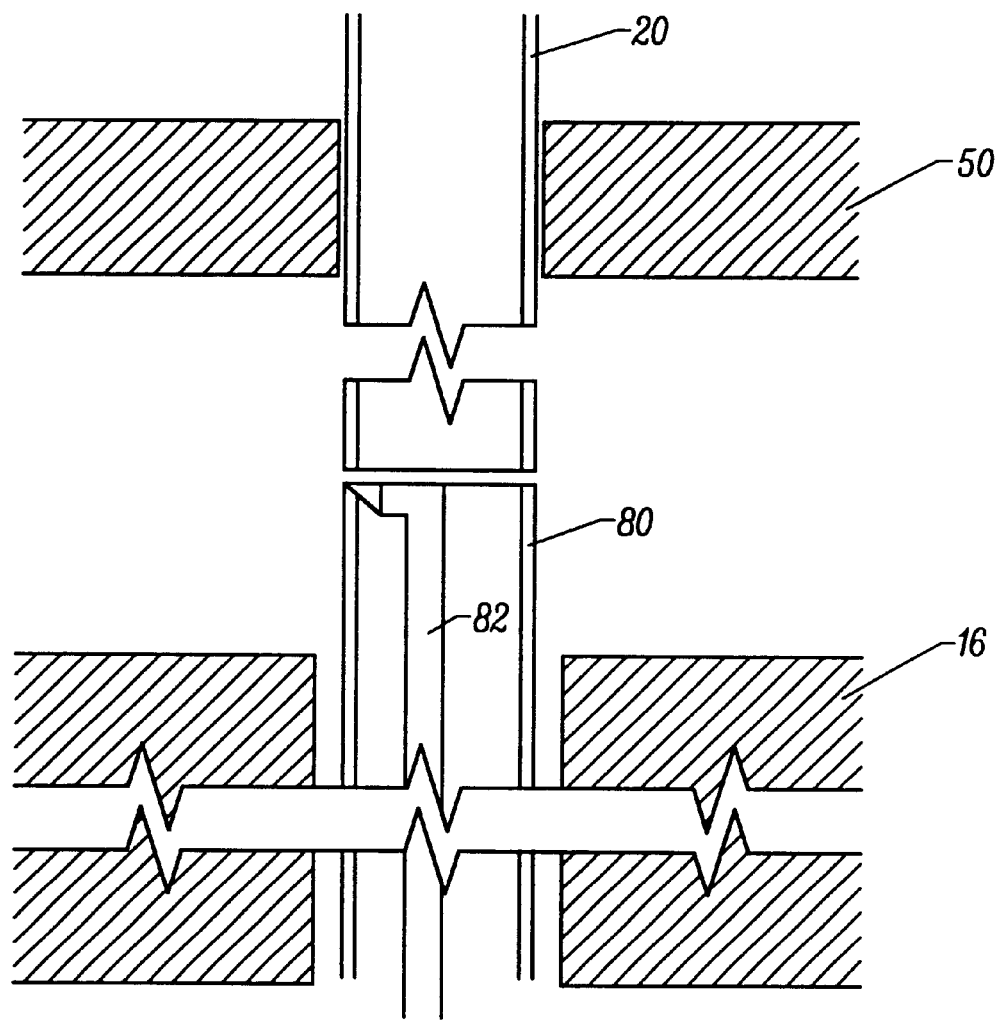
FIG. 3 illustrates a degraded tube removal step in accordance with an embodiment of the invention.

The foregoing processing steps are more fully appreciated with reference to FIGS. 3–8. FIG. 3 illustrates the operation of removing a degraded tube segment from an operative tube (step 60). The figure shows a tube sheet 16 and a support plate 50 for an operative tube 20. A degraded tube segment 80 is severed from the operative tube 20 using a cutting tool 82. The cutting tool 82 may be a mechanical cutting device. Alternatively, a laser cutting device may be used. For example, the laser welding device of the previously mentioned U.S. Pat. No. 5,514,849 may be used to sever the degraded tube segment 80 from the operative tube 20. The degraded tube segment 80 will typically be expansion fitted to the tube sheet 16 (although this is not shown in FIG. 3). A gas-tungsten arc torch may be used to heat the degraded tube segment 80 to relax the expansion fit. Thereafter, the tube section may be withdrawn through the tube sheet 16.

Figures 4, 4A:
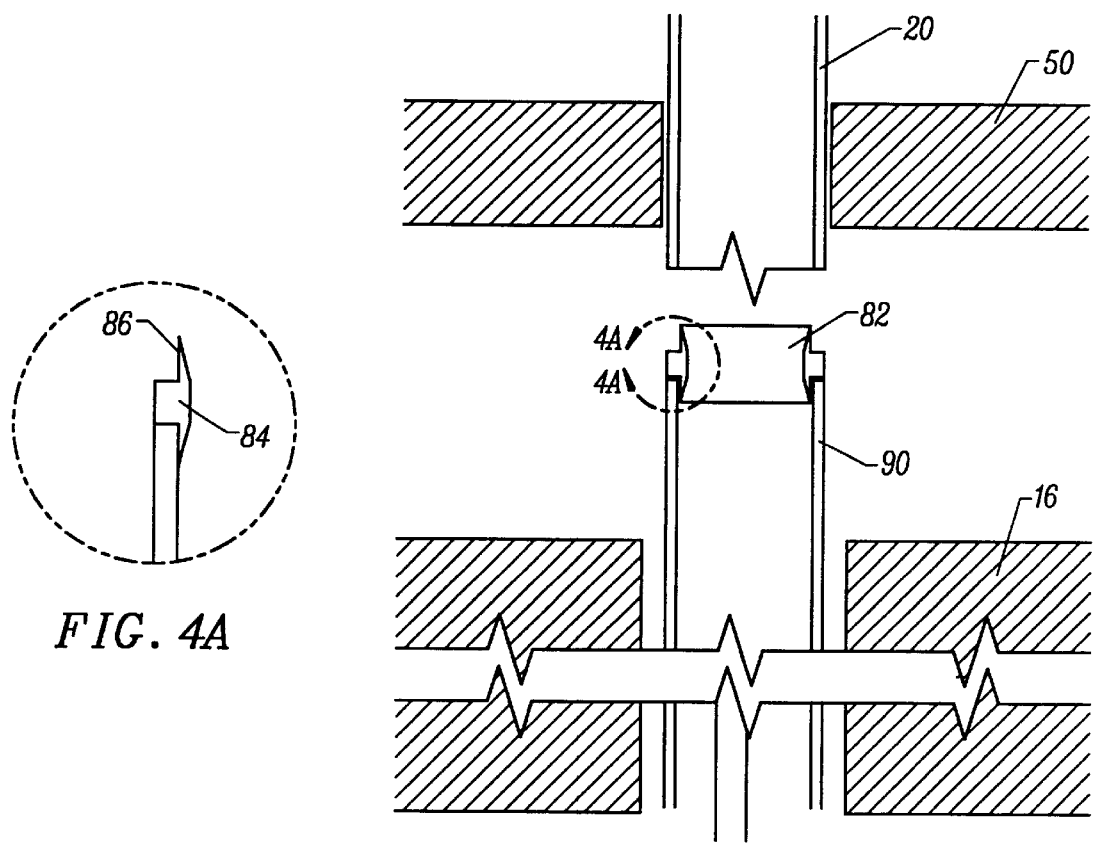
FIG. 4 illustrates a weld metal ring positioning step in accordance with an embodiment of the invention.

FIG. 4 illustrates a weld metal ring 82 in accordance with an embodiment of the invention. The weld metal ring 82 is preferably formed of an alloy 690 compatible material, such as Alloy 52 or 72. These alloys are used because of their performance characteristics in relation to their resistance to stress corrosion cracking. The weld metal ring 82 is configured to perform two roles. First, it operates to align the new tube segment 90 with the operative tube 20. Next, it provides sufficient filler metal to obtain a weld with structural integrity exceeding that of the original tube.

FIG. 4 illustrates that the weld metal ring 82 includes a T-shaped perimeter wall 84. Preferably, a tapered wall 86 is used to improve the self-aligning capability of the weld metal ring 82. The weld metal ring 82 rests on top of a new tube segment 90.

Figure 5:
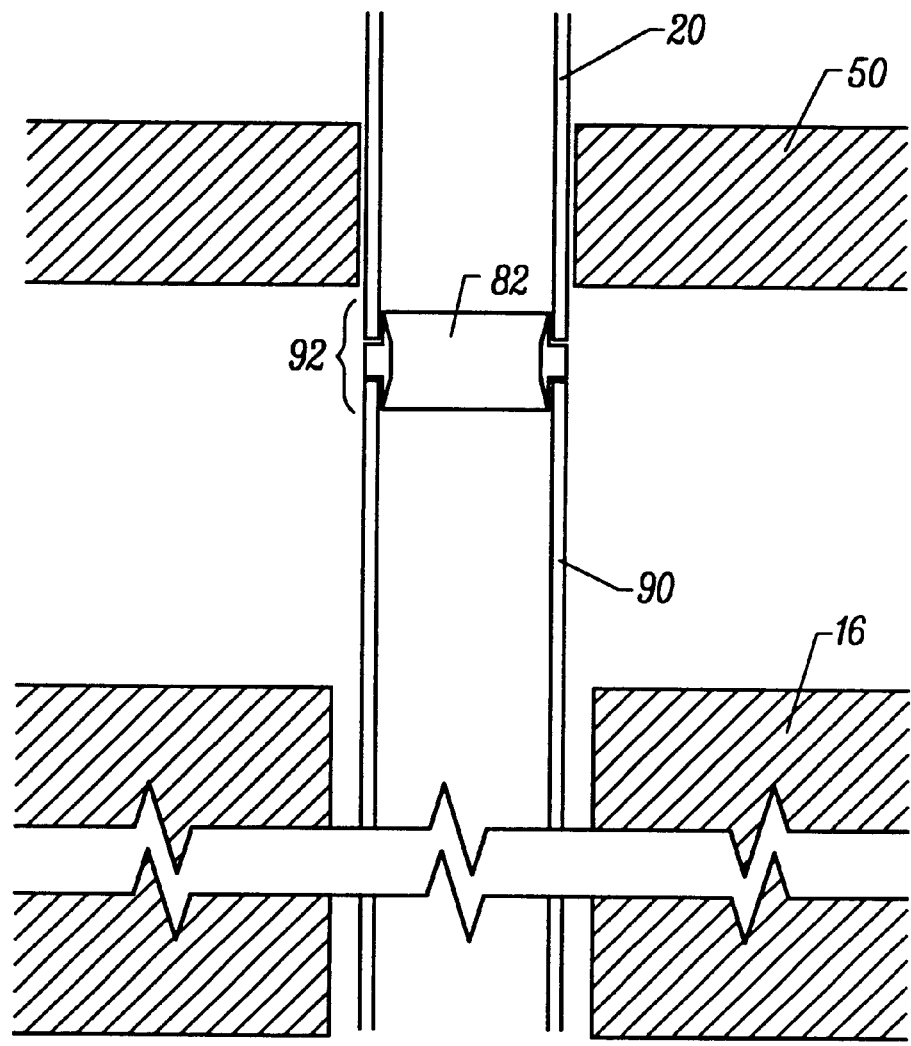
FIG. 5 illustrates a weld metal ring positioned in accordance with an embodiment of the invention.

FIG. 5 illustrates that the new tube segment 90 and the weld metal ring 82 are aligned with the operative tube 20. Alignment may be aided through the use of a mandrel which is inserted into the new tube 90 and brings it into alignment with the original tube 20 as it is inserted through the tubesheet. The final, precise alignment is facilitated by the weld metal ring 82. This completes the step of positioning the weld metal ring between the operative tube and the new tube segment (step 62).

Figure 6:
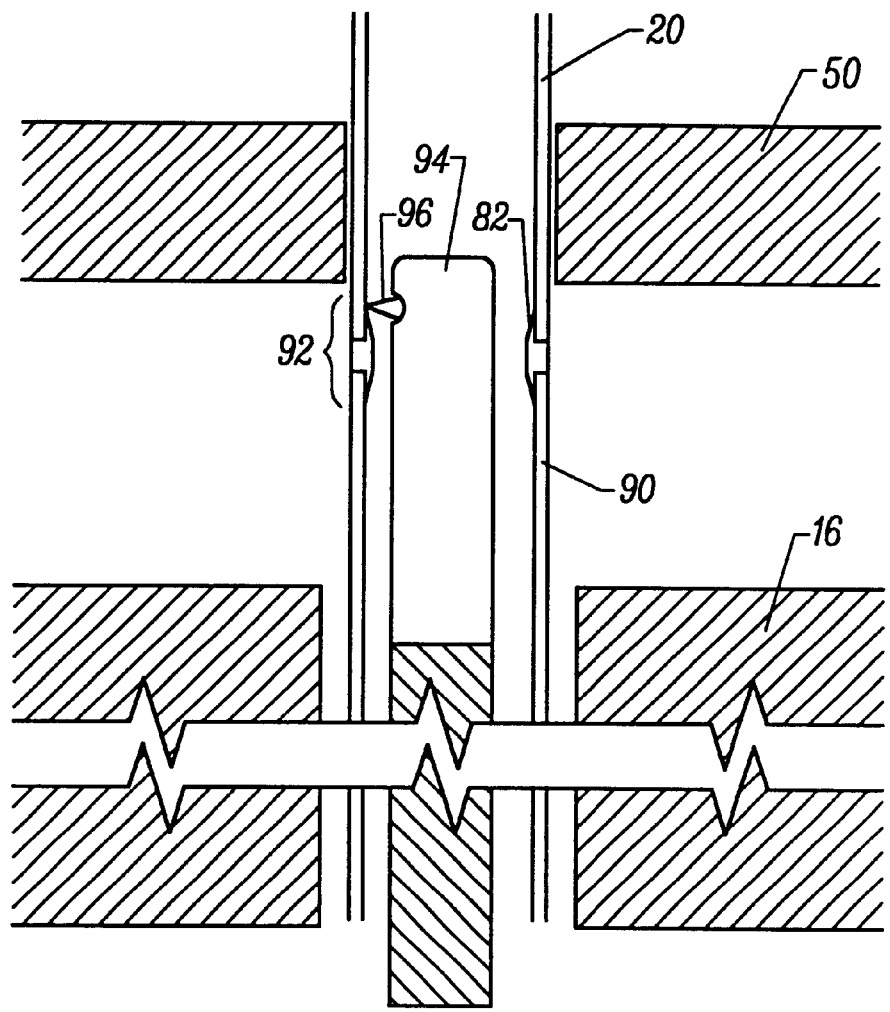
FIG. 6 illustrates a linking tube welding step in accordance with an embodiment of the invention.

FIG. 6 illustrates the operation of welding the linking tube section (step 64). In particular FIG. 6 illustrates a linking tube section 92 including a portion of the operative tube 20, the weld metal ring 82, and the new tube segment 90. The figure also shows a welding head 94 of the type used in the previously mentioned U.S. Pat. No. 5,514,849. The laser beam 96 melts the weld metal ring 82, and a portion of each tube section, permanently joining the linking tube section 92.

After the welding operation of step 64, the linking tube section 92 is preferably heat treated step (66). The post-weld heat treatment (PWHT) is performed on the weldent to relieve residual stresses and to restore the weld to a metallurgical state that is resistant to stress corrosion cracking. The heat treatment can be performed using conventional electric resistance heating techniques, or with laser heating methods. In either method, the linking tube section 92 is heated to temperatures of 1,300–1,600° F. for up to five minutes.

Figure 7:
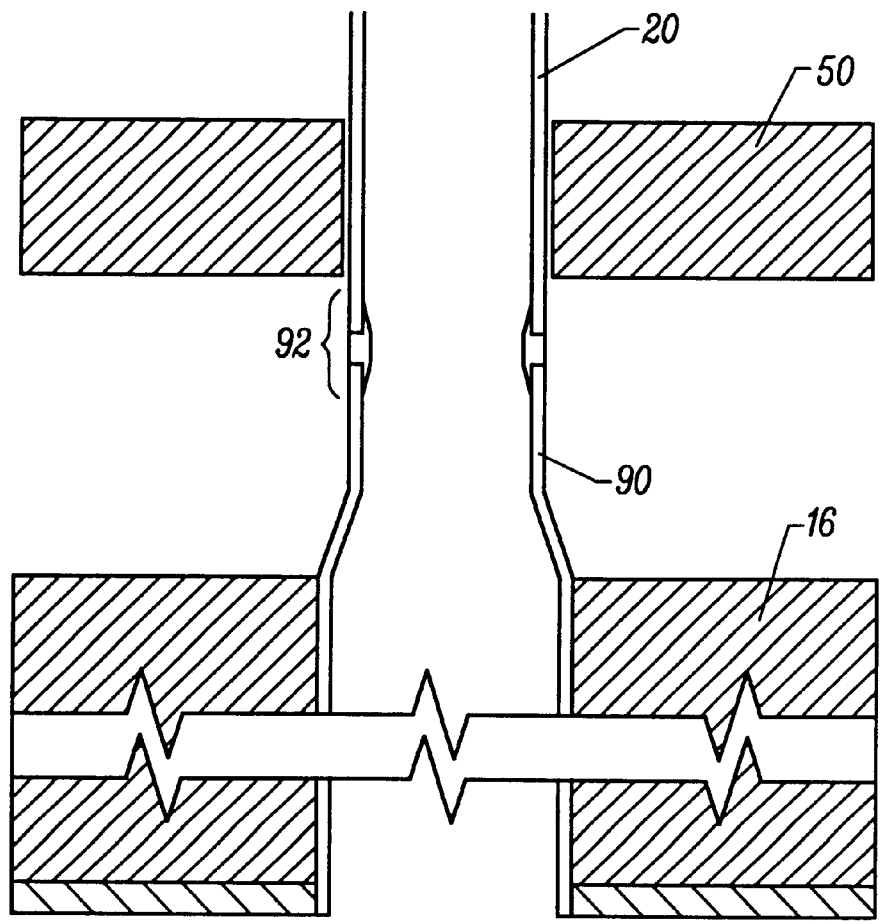
FIG. 7 illustrates a new tube segment expanded toward a steam generator tubesheet in accordance with an embodiment of the invention.

After the heat treatment of step 66, the new tube segment 90 is preferably expanded toward the tubesheet 16 (step 68). FIG. 7 illustrates the new tube segment 90 expanded to the tube sheet 16. Expansion can be performed with a number of techniques that are commonly used when constructing the tubesheet portion of a steam generator. The expansion operation is performed to prevent corrosion products from forming between the tube 90 and the tubesheet 16. The alloy 690 tube material was selected as a replacement tube material to prevent re-occurrence of a stress corrosion cracking failure in the tube-to-tubesheet region.

Figure 8:
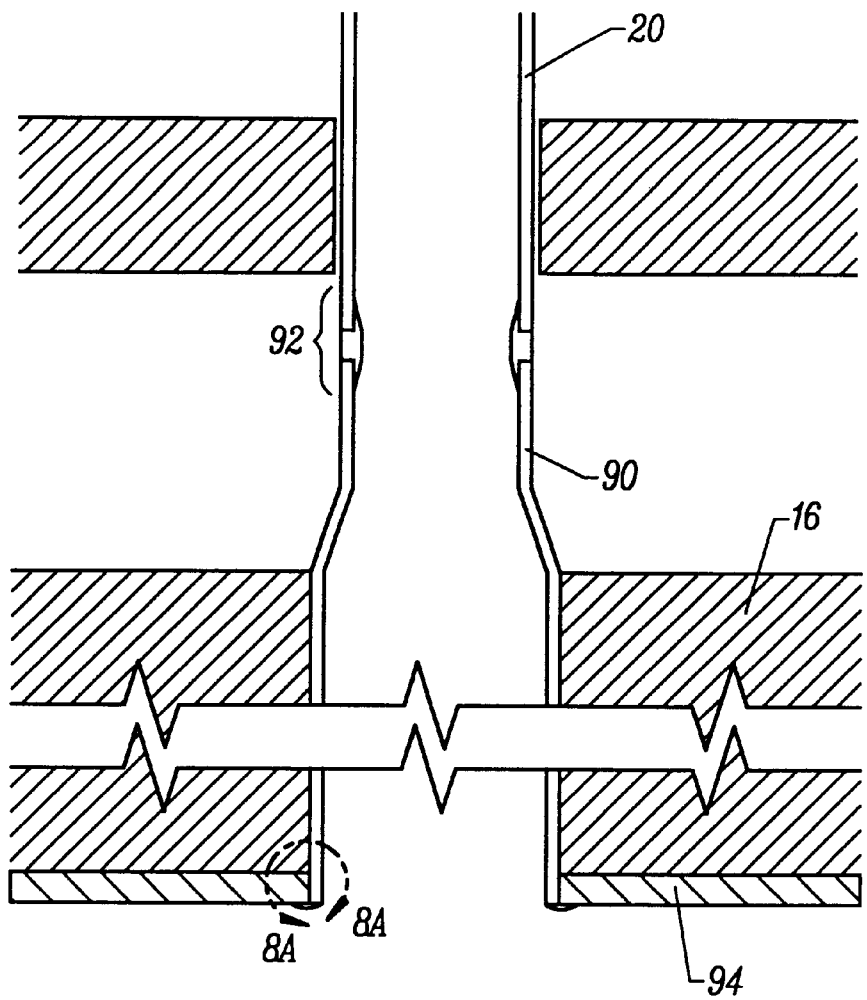
FIG. 8 illustrates a new tube segment welded to the tube sheet in accordance with an embodiment of the invention.
Figure 8A:
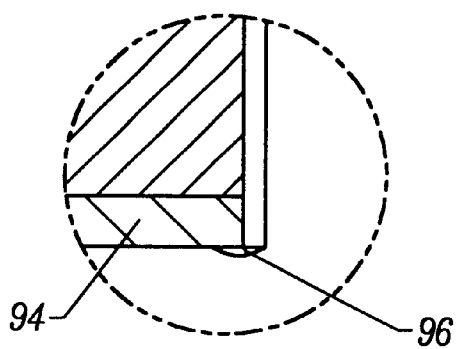

Preferably, a final step of welding the new tube segment to the tube sheet is performed (step 70). FIG. 8 illustrates tubesheet cladding 94 and a clad weld 96. The clad weld 96 may be applied using the techniques described in previously mentioned U.S. Pat. No. 5,514,849.

The sequence of processing steps of FIG. 2 minimize residual stresses along the operative tube 20 and at the linking tube section 92. Since the lower tube-to-tubesheet weld and expansion are not performed until after the tube-to-tube weld and heat treatment are completed, the new tube 90 is not restrained in a fixed position. This permits the new tube 90 to expand and contract freely during welding and heat treatment. Thus, no undesirable stresses are created during the application of these processes.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A method of repairing a heat exchanger tube in a steam generator, said method comprising the steps of:

removing a degraded tube segment from an operative heat exchanger tube in a steam generator, said removing step including the step of heating said degraded tube segment to relax the expansion fit between a tube sheet and said degraded tube segment;

positioning a weld metal ring between said operative heat exchanger tube and a new tube segment; and welding said weld metal ring to said operative heat exchanger tube and said new tube segment to form a linking tube section.

2. The method of claim 1 wherein said removing step includes the step of severing said degraded tube segment from said operative heat exchanger tube.

3. The method of claim 1 wherein said positioning step includes the step of aligning said operative heat exchanger tube and said new tube segment with said weld metal ring.

4. The method of claim 1 wherein said welding step is performed with a laser.

5. The method of claim 1 further comprising the step of heat treating said linking tube section.

6. The method of claim 1 further comprising the step of expanding said new tube segment toward a tube sheet.

7. The method of claim 6 further comprising the step of welding said new tube segment to said tube sheet.

8. A heat exchanger tube constructed by the method of claim 1.

9. A method of repairing a heat exchanger tube positioned between a tube sheet and a support plate in a steam generator, said method comprising the steps of:

removing a degraded tube segment from an operative heat exchanger tube positioned between said tube sheet and said support plate, wherein said removing step includes the step of heating said degraded tube segment to relax the expansion fit between said tube sheet and said degraded tube segment;

positioning a weld metal ring between said operative heat exchanger tube and a new tube segment;

welding said weld metal ring to said operative heat exchanger tube and said new tube segment to form a linking tube section;

heat treating said linking tube section;

expanding said new tube segment toward said tube sheet; and welding said new tube segment to said tube sheet.

10. The method of claim 9 wherein said removing step includes the step of severing said degraded tube segment from said operative heat exchanger tube.

11. The method of claim 9 wherein said positioning step includes the step of aligning said operative heat exchanger tube and said new tube segment with said weld metal ring.

12. The method of claim 9 wherein said welding steps are performed with a laser.

13. A heat exchanger tube constructed by the method of claim 9.

14. The method of claim 1 wherein said positioning step includes the step of positioning a weld metal ring with a T-shaped perimeter wall to facilitate alignment between said operative tube and said new tube segment.

15. The method of claim 1 wherein said positioning step includes the step of positioning a weld metal ring formed of an alloy 690 compatible material.

* * * * *